US009720640B2

(12) United States Patent
Pedersen et al.

(10) Patent No.: US 9,720,640 B2
(45) Date of Patent: Aug. 1, 2017

(54) MULTIFUNCTION BUTTON (71) Applicant: HALLMARK CARDS, INCORPORATED, Kansas City, MO (US)

(72) Inventors: Nicholas Pedersen, Lawrence, KS (US); Jill Marie Klegin, Kansas City, MO (US); Kevin J. Bridges, Leawood, KS (US)

(73) Assignee: Hallmark Cards, Incorporated, Kansas City, MO (US)

( * ) Notice: Subject to any disclaimer, the term of this patent is extended or adjusted under 35 U.S.C. 154(b) by 309 days.

(21) Appl. No.: 14/462,095

(22) Filed: Aug. 18, 2014

(65) Prior Publication Data

US 2015/0054733 A1 Feb. 26, 2015

Related U.S. Application Data (60) Provisional application No. 61/867,925, filed on Aug. 20, 2013.

(51) Int. Cl.
*G09G 5/00* (2006.01)
*G06F 3/16* (2006.01)
(Continued)

(52) U.S. Cl.
CPC ............... *G06F 3/162* (2013.01); *A63H 5/00* (2013.01); *A63H 33/38* (2013.01); *G11B 27/031* (2013.01);
(Continued)

(58) Field of Classification Search
CPC .. G06F 3/016; G06F 3/162; G06F 2206/1008; A63H 5/00; A63H 33/38; A63H 2200/00; G11B 27/031; G11B 27/105
See application file for complete search history.

(56) References Cited

U.S. PATENT DOCUMENTS 4,179,714 A 12/1979 Kobayashi
4,695,942 A 9/1987 Levine et al.
(Continued)

OTHER PUBLICATIONS

Canadian Examination Report dated Mar. 4, 2016 in Application No. 2,859,905, 4 pages.
(Continued)

*Primary Examiner* — Amare Mengistu
*Assistant Examiner* — Crystal A Mathews
(74) *Attorney, Agent, or Firm* — Shook, Hardy & Bacon L.L.P.

(57) ABSTRACT

Aspects of the present invention enable a storage device (e.g., a recordable book, toy, computing device) to be controlled with a single control button that performs multiple functions. Different interactions with the button produce a different control input. In one aspect, the storage device is an audio recording device that can record, lock, unlock, transfer to a separate storage device, or play back one or more audio recordings. These five functions (i.e., recording, locking, unlocking, transferring, and playing back) are initiated or facilitated by depressing a single button located on the audio storage device for different lengths of time or in different patterns. Audio recordings may be played in response to user interactions with the button to help the user interact with the button properly and warn the user of action that is about to be taken.

20 Claims, 7 Drawing Sheets (51) Int. Cl.
  *A63H 5/00* (2006.01)
  *A63H 33/38* (2006.01)
  *G11B 27/031* (2006.01)
  *G11B 27/10* (2006.01)

(52) U.S. Cl.
  CPC ........ *G11B 27/105* (2013.01); *A63H 2200/00* (2013.01); *G06F 2206/1008* (2013.01)

(56) References Cited

U.S. PATENT DOCUMENTS

| | | | |
|---|---|---|---|
| 5,161,199 A | 11/1992 | David et al. | |
| 5,841,878 A * | 11/1998 | Arnold | G09F 27/00 381/124 |
| 6,130,624 A * | 10/2000 | Guyer | G08C 17/00 340/12.55 |
| 8,407,623 B2 * | 3/2013 | Kerr | G06F 3/04883 715/840 |
| 9,202,391 B1 * | 12/2015 | Nelson | G09F 1/08 |
| 2004/0237359 A1 * | 12/2004 | Lee | G09F 25/00 40/124.03 |
| 2009/0177385 A1 * | 7/2009 | Matas | G01C 21/3614 701/533 |
| 2009/0326955 A1 * | 12/2009 | Vantieghem | B42D 15/022 704/272 |
| 2010/0011632 A1 * | 1/2010 | Shields | B42D 15/04 40/124.01 |
| 2010/0050486 A1 * | 3/2010 | Clegg | B42D 15/022 40/124.09 |
| 2010/0307036 A1 * | 12/2010 | Lien | A63H 33/38 40/124.03 |
| 2010/0328224 A1 * | 12/2010 | Kerr | G06F 3/04883 345/173 |
| 2011/0078931 A1 * | 4/2011 | Sapp | B42D 15/022 40/124.03 |
| 2011/0154698 A1 * | 6/2011 | Lin | B42D 15/022 40/124.03 |
| 2012/0229377 A1 * | 9/2012 | Kim | G06F 3/017 345/157 |
| 2013/0021737 A1 * | 1/2013 | Kokuryu | H04W 52/0264 361/679.26 |
| 2013/0082958 A1 * | 4/2013 | Reeves | G06F 3/1438 345/173 |
| 2013/0125429 A1 * | 5/2013 | Flesher | B42D 15/022 40/124.03 |
| 2013/0162534 A1 * | 6/2013 | Chen | G06F 3/0346 345/158 |
| 2013/0326421 A1 * | 12/2013 | Jo | G06F 3/0482 715/841 |
| 2013/0329183 A1 * | 12/2013 | Blum | G02C 11/10 351/158 |
| 2014/0282002 A1 * | 9/2014 | Mckiel, Jr. | G06F 3/167 715/727 |
| 2014/0289599 A1 * | 9/2014 | Huggins | G06F 3/0488 715/209 |
| 2014/0325353 A1 * | 10/2014 | Chudge | G06F 3/167 715/716 |
| 2014/0364967 A1 * | 12/2014 | Sullivan | G06F 3/165 700/83 |
| 2015/0242185 A1 * | 8/2015 | Stone | A63H 33/38 345/174 |

OTHER PUBLICATIONS

Canadian Office Action dated Mar. 30, 2017 for Canadian Patent Application No. 2859905, 4 pages.

* cited by examiner

MULTIFUNCTION BUTTON

CROSS-REFERENCE TO RELATED APPLICATIONS

This application claims the benefit of U.S. Provisional Application No. 61/867,925 filed Aug. 20, 2013, which is herein incorporated by reference.

BACKGROUND

Audio storage devices may include prompts meant to elicit an audible response from a user. The audible response is recorded and may be transferred to other devices via a USB cord or other method. Existing storage devices typically include several individual single-function buttons. For example, pressing a first button may cause a sound to be played, pressing a second button causes a new recording to be made, a third button causes a file to be transferred, a fourth button is used to delete a file, and so on.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the present invention enable a storage device (e.g., a recordable book, toy, computing device) to be controlled with a single control button that performs multiple functions. In one aspect, the storage device is an audio recording device that can record, lock, unlock, transfer to a separate storage device, or play back one or more audio recordings. These five functions (i.e., recording, locking, unlocking, transferring, and playing back) are initiated or facilitated by depressing a single button located on the audio storage device for different lengths of time or in different patterns. Audio recordings may be played in response to user interactions with the button to help the user interact with the button properly and warn the user of an action that is about to be taken. Different interactions with the button include tapping the button once, tapping the button multiple times (e.g., twice, three times, five times), holding the button down for a first duration and then releasing, and holding the button down for a second duration and then releasing.

BRIEF DESCRIPTION OF THE DRAWINGS

Aspects of the invention are described in detail below with reference to the attached drawing figures, wherein.

DETAILED DESCRIPTION

The subject matter of aspects of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In one aspect, the audio storage device (e.g., a recordable book, toy, computing device) records a few seconds of audio or video in response to a user double-clicking the single button. When a user depresses then releases the single button, the device may initiate playback of the recorded audio. To transfer the audio recording and associated metadata to another computing device, the button may be held down for a first threshold amount of time. Once the button has been held down for a first threshold of time (e.g., two seconds), the device may play the following message (or similar): "release to transfer message, continue holding to lock." If the user releases the single button, then the message will be transferred.

If the user continues to depress and hold down the single button for a second threshold amount of time that is longer than the first threshold, the user may have the option to lock or unlock a previously recorded message. To lock the message, the user may depress the single button for the second threshold amount of time (e.g., ten seconds). Upon doing so, the device will play the following message (or similar): "release to lock message." If the user releases the single button after hearing the message, the audio storage device locks the message. When the recorded audio is locked, re-recording over a message is not possible. To unlock the message, the user may depress the single button for the second threshold amount of time. When depressed for the second threshold amount of time, the following message (or similar) will be played: "release to unlock the message." If the user releases the single button, then the device will unlock the message and the message may be recorded over.

Having briefly described an overview of aspects of the invention, an exemplary operating environment suitable for use in implementing aspects of the invention is described below.

Exemplary Operating Environment

Figure 1:
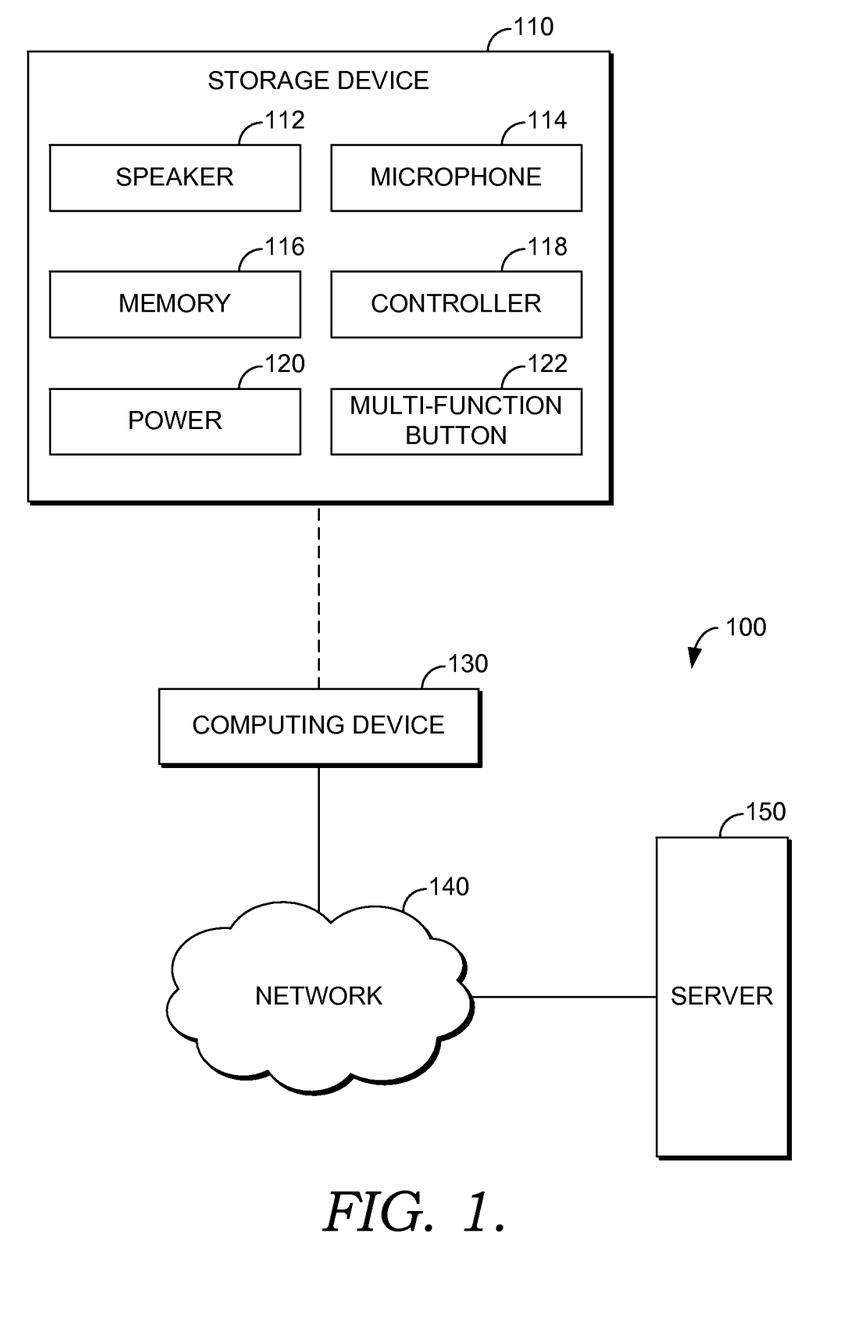
FIG. 1 is a block diagram of an exemplary computing environment suitable for implementing aspects of the invention.

Turning now to FIG. 1, an exemplary computing environment 100 is shown, in accordance with an aspect of the present invention. The computing environment 100 includes a storage device 110, a computing device 130, a network 140, and a remote server 150. The computing device 130 is connected to the server 150 through network 140. The network 140 may be a wide area network, such as the Internet. The computing system environment 100 shown in FIG. 1 is merely an example of one suitable computing system environment and is not intended to suggest any limitation as to the scope of use or functionality of aspects of the present invention. Neither should the computing system environment 100 be interpreted as having any dependency or requirement related to any single module/component or combination of modules/components illustrated therein.

The server 150 may provide a storage service for users. The storage service may store audio recordings, images, and other content for the user to retrieve when convenient. The service provided by the server 150 may be associated with one or more storage devices that prompt users to respond to a question. The response to the prompt may be recorded and stored in an audio file.

The storage device 110 comprises an audio speaker 112, a microphone 114, computer memory 116, a controller 118, a power supply 120, and a multifunction button 122. The storage device 110 may take the form of a toy, a recordable storybook, or some other computing device capable of recording audio, storing audio files, and transferring audio files to another device. Both the storage device 110 and computing device 130 may be capable of wireless or wired communications.

In aspects, storage devices may include multiple speakers. The speaker 112 is used to play audio files stored on the storage device. The speaker 112 may also be used to provide an audible prompt to which a user responds. For example, the prompt could ask a child what the child wants for Christmas. The child's response could be recorded in an audio file.

The microphone 114 may be used to record a user's response to a prompt. The memory 116 is used to record audio files, which store sounds captured by the microphone 114. The memory 116 may also store computer instructions that enable recording, prompting, file transfers, and otherwise enable operation of the storage device. The memory 116 may include a software that defines responses to different inputs provided by the multifunction button 122. Though not shown, the storage device may also include a camera capable of capturing pictures or video. Additionally, the storage device may include a touch pad or touchscreen capable of receiving user handwriting, drawings, and other user created animations that may be stored and transferred. For the sake of simplicity, aspects of the present invention are primarily described in terms of audio files and audio content. However, content such as videos, pictures, digital drawings, and user created animations are contemplated to be within the scope of aspects of the present invention.

The controller 118 may be a computer processor or other hardware and software capable of controlling the storage device 110. The controller 118 may access or run programs stored in the memory 116. The controller 118 may respond to user inputs and generate outputs in response.

The power supply 120 may be a battery, AC supply, DC supply, or other suitable power supply for the storage device.

The multifunction button 122 may comprise both a physical button apparatus and coding that initiates different functions based on different interactions with the button. As used herein, the term "button" refers to an apparatus that is able to transition between only two positions. Specifically, the button is able to transition between an open position and a closed position. Further, the button automatically transitions to the open position when pressure is removed from the button (e.g., when a user's finger is removed). When the button is in the process of transitioning between positions, it is still considered in the open position until contact is made with a sensor indicating the button has reached the closed position. The closed position may correspond to a pressed button.

The button may include a spring or other apparatus that applies tension to the button and maintains the button in an open position absent a force applied to the button. The button transitions from the open position to the closed position upon receiving a mechanical pressure large enough to overcome the tension provided by the spring apparatus. Upon the removal or lessening of the mechanical pressure, the button returns to an open position automatically.

Aspects of the invention also contemplate a touch-based button. A touch-based button closes upon receiving contact from a physical object, such as a finger or stylus, and does not require an amount of force to close. For example, a touch-based button may be displayed on a touchscreen computing device. Touch-based buttons may also be found in appliances and toys. A touch-based button may have a resistor or capacitive surface that detects a touch through a change to an electrical circuit of which the resistor or capacitors are a part.

The multifunction button 122 includes the ability to determine a duration for which the multifunction button 122 is held open or closed. For example, the multifunction button 122 may be able to determine that it was held in the closed position 0.5 seconds, then open for one second, and then closed for 0.4 seconds. The multifunction button 122 is able to trigger responses based on interactions meeting different criteria.

Aspects of the invention are not dependent on the particular component of a storage device 110 that responds to the button input. For example, a multifunction button 122 could provide an indication of its status to another component, such as the controller 118. A program running on the controller 118 could respond to the status messages to initiate an associated control function in response to the interaction reflected by the status. In another aspect, the responses could be triggered by the multifunction button 122.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the invention may be practiced in a variety of system configurations, including handheld devices, consumer electronics, general-purpose computers, specialty computing devices, etc. Aspects of the invention may also be practiced in distributed computing environments where tasks are performed by remote-processing devices that are linked through a communications network.

Storage device 110 and computing device 130 typically include a variety of computer-readable media. Computer-readable media can be any available media that can be accessed by a computing device and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVDs) or other optical disk storage, magnetic cassettes, magnetic tape, and magnetic disk storage or other magnetic storage devices. Computer storage media does not comprise a propagated data signal or other forms of communication media.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Although the various blocks of FIG. 1 are shown with lines for the sake of clarity, in reality, delineating various components is not so clear, and metaphorically, the lines would more accurately be grey and fuzzy. For example, processors have memory. The inventors hereof recognize that such is the nature of the art and reiterate that the diagram of FIG. 1 is merely illustrative of an exemplary computing device that can be used in connection with one or more aspects of the invention. Distinction is not made between such categories as "workstation," "server," "laptop," "handheld device," etc., as all are contemplated within the scope of FIG. 1 and refer to "computer" or "computing device."

Figure 2:
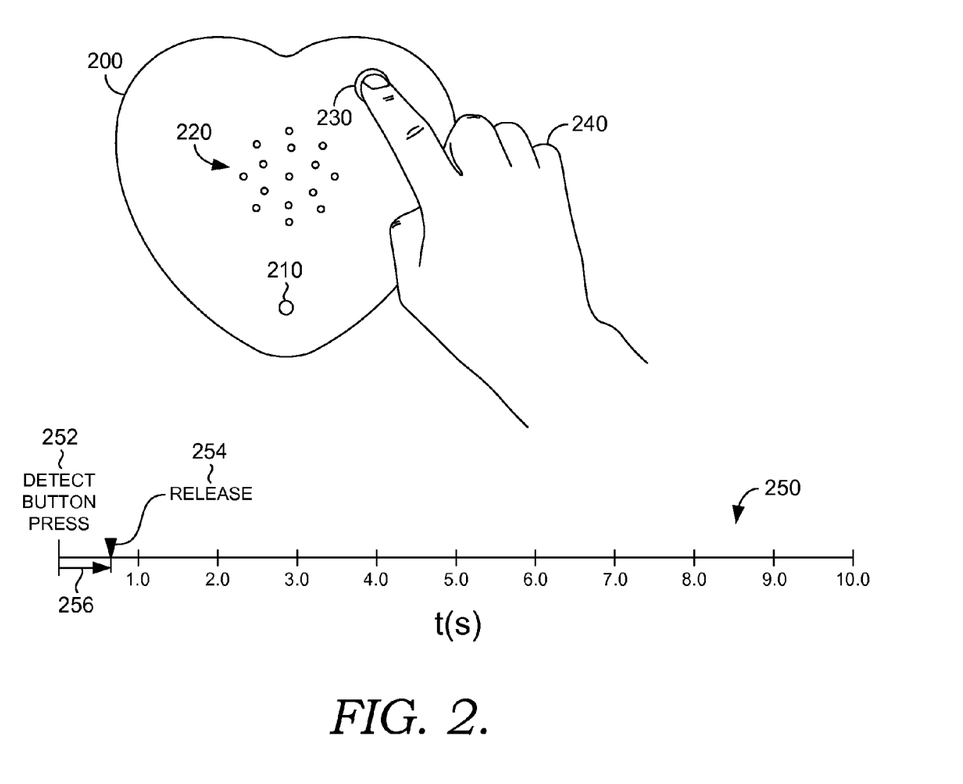
FIG. 2 is a diagram of a storage device having a multifunction button that is tapped once to initiate a first function, in accordance with an aspect of the present invention.

FIG. 2 is a diagram of a storage device having a multifunction button that is tapped once to initiate a first function, in accordance with an aspect of the present invention. As mentioned, aspects of the present invention may be used to transfer files from storage devices that are intended to capture a child's voice, video, or other user input. In this case, the storage device is a heart-shaped toy 200. The toy 200 includes a speaker 220 and a microphone 210. The storage device also includes a multifunction button 230 that is being depressed by a finger 240. The storage device 200 may be similar to the storage device 110 described previously with reference to FIG. 1.

FIG. 2 includes a timeline 250 that illustrates actions that comprise a single tap and cause a function associated with a single tap to be performed. The timeline 250 runs from zero to ten seconds. At zero seconds, a button press 252 is detected. At 0.5 seconds, a button release 254 is detected. Thus, the duration of the button press is 0.5 seconds. In one aspect, a tap is defined as a button press lasting 0.75 seconds or less, for example, 0.5 seconds, 0.25 seconds, or less. In one aspect, a button press lasting greater than 0.75 seconds is defined as a button hold. In one aspect, an audible prompt is not provided in response to a button press defined as a tap. In one aspect, a single tap corresponds to an instruction to play a recorded audio or video file.

Figure 3:
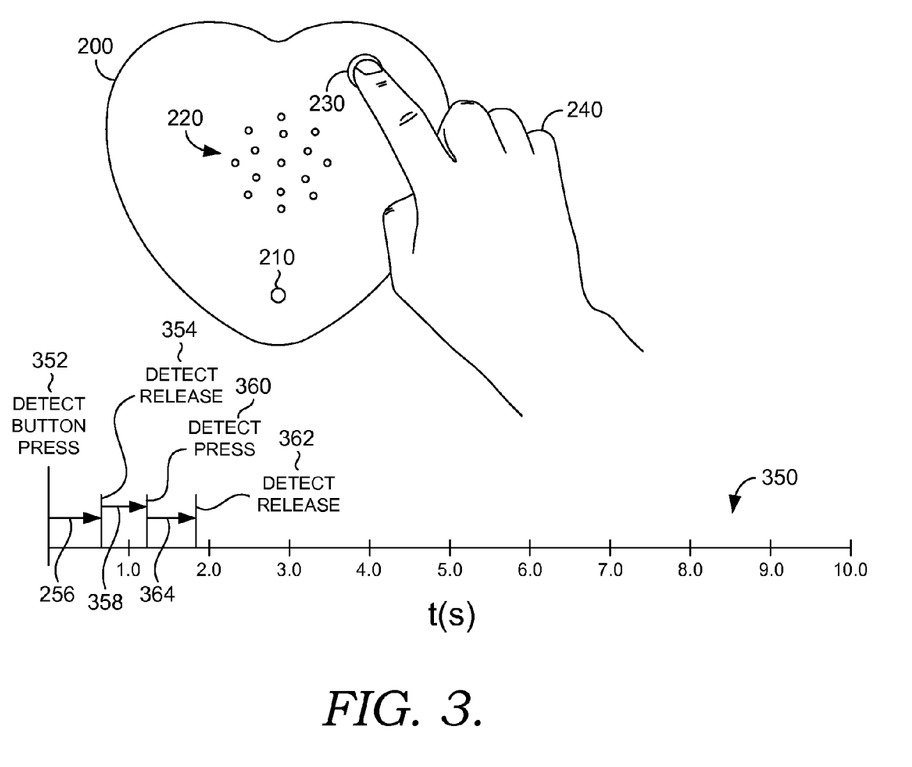
FIG. 3 is a diagram of a storage device having a multifunction button that is tapped twice to initiate a second function, in accordance with an aspect of the present invention.

Turning now to FIG. 3, a diagram of a storage device having a multifunction button that is tapped twice to initiate a second function is provided, in accordance with an aspect of the present invention. The storage device 200 depicted in FIG. 3 is the same as the storage device 200 depicted in FIG. 2. The timeline 350 shows interactions that comprise a double tap. At zero seconds, a button press 352 is detected. At 0.4 seconds, a button release 354 is detected. Accordingly, the first button press is interpreted as a tap because it only lasted 0.4 seconds. A tap could be defined as two seconds or less, for example 1.5 seconds, one second, or 0.5 seconds. At 1.2 seconds, a second button press 360 is detected. At 1.8 seconds, a button release 362 is detected. Accordingly, the second button press is also interpreted as a tap because it lasted only 0.6 seconds.

The time elapsed between taps determines whether each tap is interpreted separately or as a combination. In this case, 0.8 seconds elapsed between the first tap concluding at 0.4 seconds and the second tap being initiated at 1.2 seconds. In one aspect, an elapsed time of one second or less between taps causes the task to be interpreted as a double tap. A double tap may be associated with a different functionality from a single tap. For example, a single tap may play a recording while a double tap causes a new recording to be created.

Figure 4:
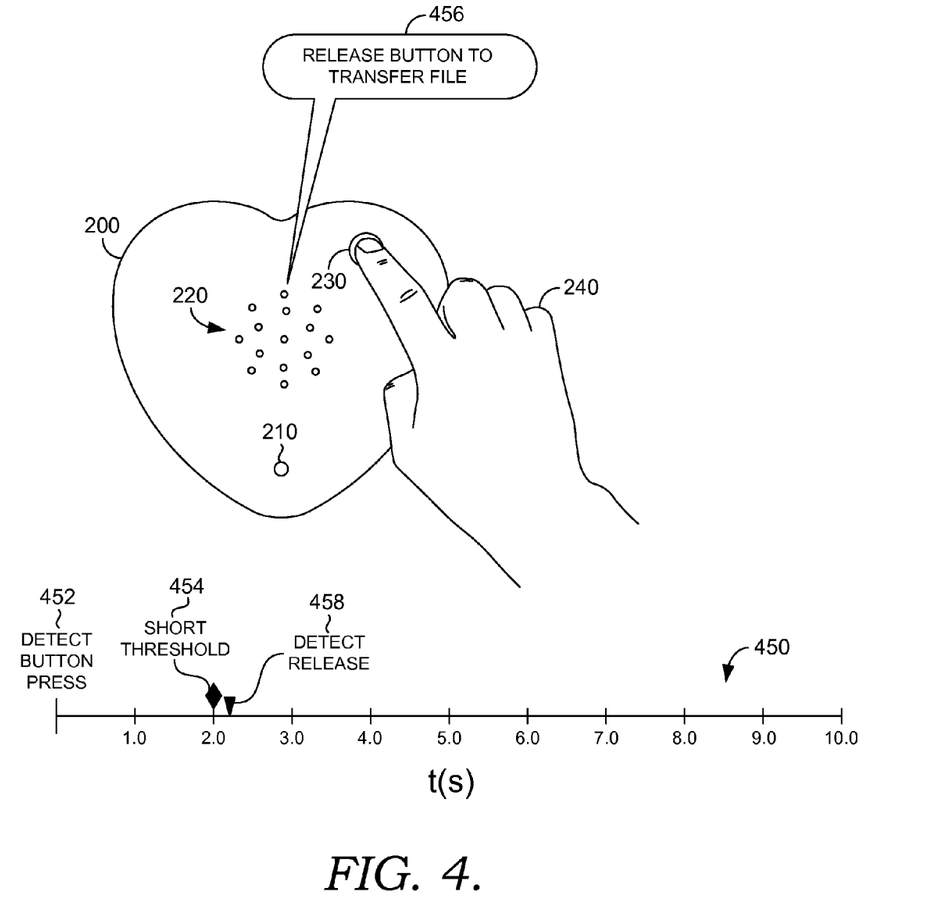
FIG. 4 is a diagram of a storage device having a multifunction button that is held down for a short duration threshold to initiate a third function, in accordance with an aspect of the present invention.
Figure 5:
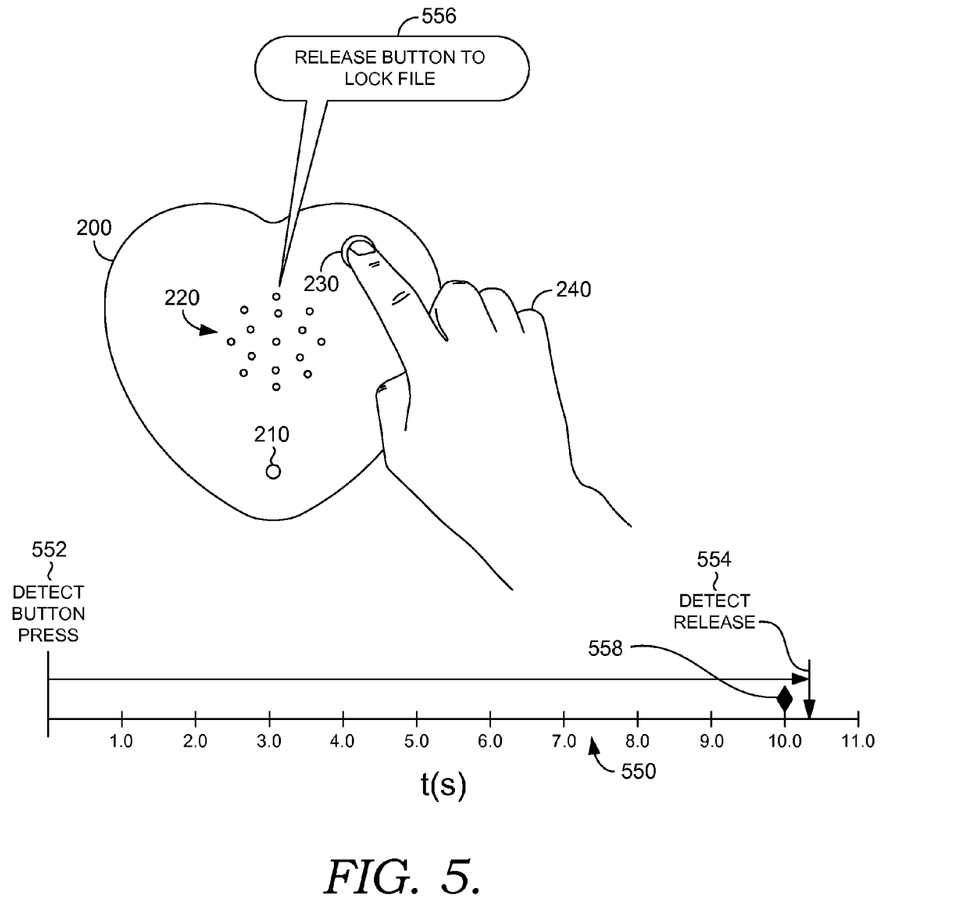
FIG. 5 is a diagram of a storage device having a multifunction button that is held down for a long duration threshold to initiate a fourth function, in accordance with an aspect of the present invention.

In addition to taps, pressing and holding the multifunction button for different durations of time may be associated with different functionalities. As the hold approaches a threshold, an audible cue may be played to let the user know what action will be taken if the user releases the button. For example, three different functions may be associated with a single button based on the length of time the button is held. In one aspect, common tasks are associated with shorter hold times. A three-function button could play a recording if pressed and held less than a first threshold, record when pressed and held longer than the first threshold, and lock or unlock an active recording when pressed and held longer than a second threshold. In one aspect, the short threshold is two seconds and the long threshold is ten seconds. FIGS. 4 and 5 illustrate different press and hold scenarios.

Turning now to FIG. 4, a storage device having a multifunction button that is held down for a short threshold is provided, in accordance with an aspect of the present invention. The storage device 200 is the same as described previously. The timeline 450 runs from zero to ten seconds. At zero seconds, a button press 452 is detected. At 2.2 seconds, a button release 458 is detected. After two seconds, the short threshold 454 is reached. A short threshold of two seconds is provided as an example. Aspects of the invention are not limited to a two-second threshold. Upon reaching the short threshold, an audible announcement 456 is made by the storage device 200 notifying the user that a file transfer may be initiated by releasing the multifunction button 230. Upon releasing the button beyond the short threshold, the file transfer is initiated. Had a user released the multifunction button 230 prior to reaching the short threshold 454, then a function associated with a press and hold of less than the short threshold 454 could be initiated. In one aspect, pressing and releasing the multifunction button 230 before reaching the short threshold constitutes a single tap. In other words, the tap threshold may correspond to the short threshold 454. In this arrangement, a press and hold of less than the short threshold is a tap.

Turning now to FIG. 5, a long press and hold is illustrated, in accordance with an aspect of the present invention. Timeline 550 runs from zero seconds to eleven seconds. The long threshold 558 is set at ten seconds. At zero seconds, a button press 552 is detected. At 10.3 seconds, a button release 554 is detected. Upon the press and hold reaching the long threshold 558, an audible announcement 556 is played by the storage device 200. The audible announcement 556 indicates that releasing the button will cause a stored audio file to be locked. In one aspect, the long threshold is associated with changing the lock status of an active audio file. The active audio file may be the one most recently created or played. When only one audio file is stored, then the single audio file is the active audio file. Changing the lock status will cause a locked file to be unlocked and an unlocked file to be locked. A locked file may not be deleted or altered.

In one aspect, the multifunction button is associated with three or more different functions each associated with a unique interaction. For example, the multifunction button may be associated with four or more functions, five or more functions, or six or more functions. Exemplary functions include playing an audio file, pausing or stopping an audio file from playing, fast-forwarding an audio file, rewinding an audio file, deleting an audio file, selecting an audio file among several audio files, transferring an audio file, changing the lock status of an audio file, and recording a new audio file.

The functions and combination of functions may be context specific. For example, pausing or stopping an audio file from play may be available only when an audio file is playing. The same button interaction may produce a different result based on context. For example, a single tap may result in playing an audio file. When playing, a double tap may pause the audio file. When paused, another double tap may fast-forward the audio file. When paused, a triple tap may rewind the audio file. Thus, in one aspect, rewinding or fast-forwarding may only occur after an audio file is paused. When an audio file is not playing, a double tap may record a new audio file.

In one aspect, a multifunction button is the only control button provided on a storage device. As used herein, a control button causes different functions on the storage device to be performed. Turning the power on and off may not be considered as a function of the storage device. Even when only a single control button is provided, a second non-control button or switch may be used to turn the device power on and off.

In another aspect, a control function may be tied to a multifunction button interaction that comprises a single tap followed by a press and hold. The single tap may be identified by pressing the multifunction button for a duration that is less than a tap threshold, or less than a short hold threshold, for example, less than two seconds. The hold may be defined by pressing the multifunction button for greater than a threshold duration. In one aspect, the threshold duration is the tap threshold. The tap and the press and hold may need to be separated by less than a designated duration. For example, the press and hold action may need to occur with less than one second passing with the multifunction button in the open position from the tap.

As an example of the tap once and then press and hold interaction, a user may activate the function by pressing the multifunction button for two seconds or less, releasing the multifunction button for less than one second, and then pressing and holding the multifunction button for more than two seconds.

Figure 6:
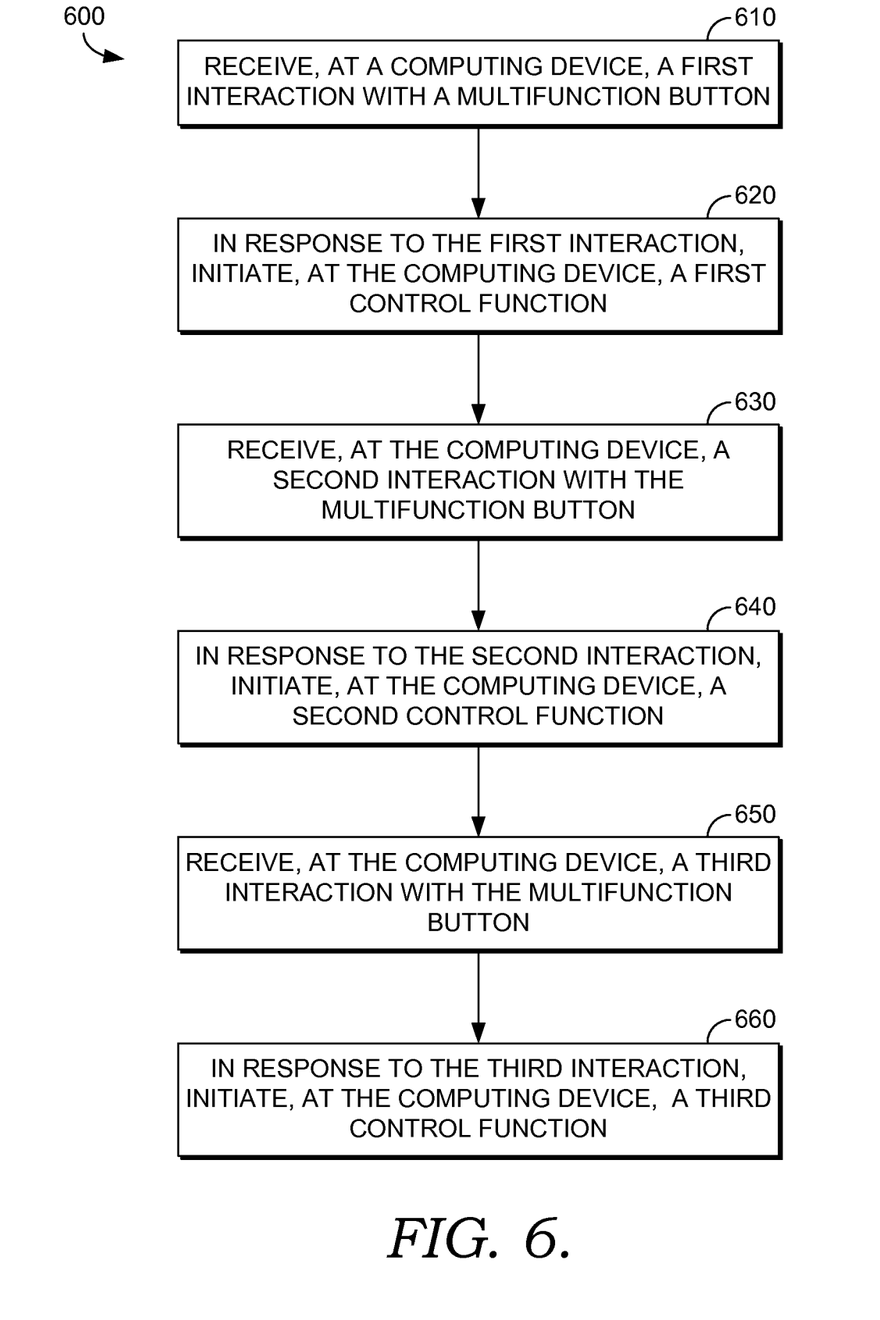
FIG. 6 is a diagram of a flow chart showing a method of performing multiple functions through a single button, in accordance with an aspect of the present invention.

Turning now to FIG. 6, a method 600 of providing multiple functions through a single button is shown, in accordance with an aspect of the present invention. The button may be described herein as a multifunction button. Method 600 may be performed by a computing device, such as storage device 200 described previously. The storage device may store audio and/or visual recordings. The audio and/or visual recordings may be captured by sensors, such as a camera or microphone, on the storage device. The storage device may have computer-executable instructions for performing method 600 when the computer-executable instructions are executed by a processor associated with the storage device.

At step 610, a first interaction with a multifunction button is received. As mentioned, the multifunction button may be integrated with a computing device. The multifunction button may be a hard button that is depressed and released by a user's finger or some other object. The multifunction button may also be a touch-sensitive button, such as a button found on a touchscreen display or other touch-sensitive interface. A touch-sensitive button may not move when activated or deactivated. The first interaction may comprise activating the multifunction button by depressing the multifunction button or touching the multifunction button. The interaction may be a tap or a press and hold event.

At step 620, in response to the first interaction, a first control function is initiated. The first control function may play an existing audio recording. An existing audio recording is a recording that is stored on the computing device.

At step 630, a second interaction with a multifunction button is received. A significant period of time may have elapsed between the first interaction and the second interaction. For example, ten seconds, ten minutes, ten hours, or ten days may have elapsed between the first interaction and the second interaction. The second interaction with a multifunction button is different from the first interaction. For example, the first interaction may be a tap on the multifunction button and the second interaction may be a short hold. A tap and a short hold have been explained previously.

At step 640, in response to the second interaction, a second control function is initiated at the computing device. A second control function is distinct from the first control function. For example, the first control function may play an existing recording while the second control function deletes the existing recording.

At step 650, a third interaction with a multifunction button is received. The third interaction is distinct from the first interaction and the second interaction. The third interaction may be separated from the first and second interactions by a period of time, such as ten seconds, ten minutes, ten hours, etc. The third interaction is also distinct in character from the first and second interactions. For example, the first interaction may be a tap, the second interaction a short press and hold, and the third interaction a long press and hold of the multifunction button. As used herein, "press" and "press and hold" may be used interchangeably.

At step 660, a third control function is initiated in response to the third interaction. Like the first and second control functions, the third control function is distinct from the others. For example, the third control function may cause an existing audio file to be transferred to a different device. The transfer could be initiated over a wireless coupling or a wired coupling, such as via a USB cable.

Figure 7:
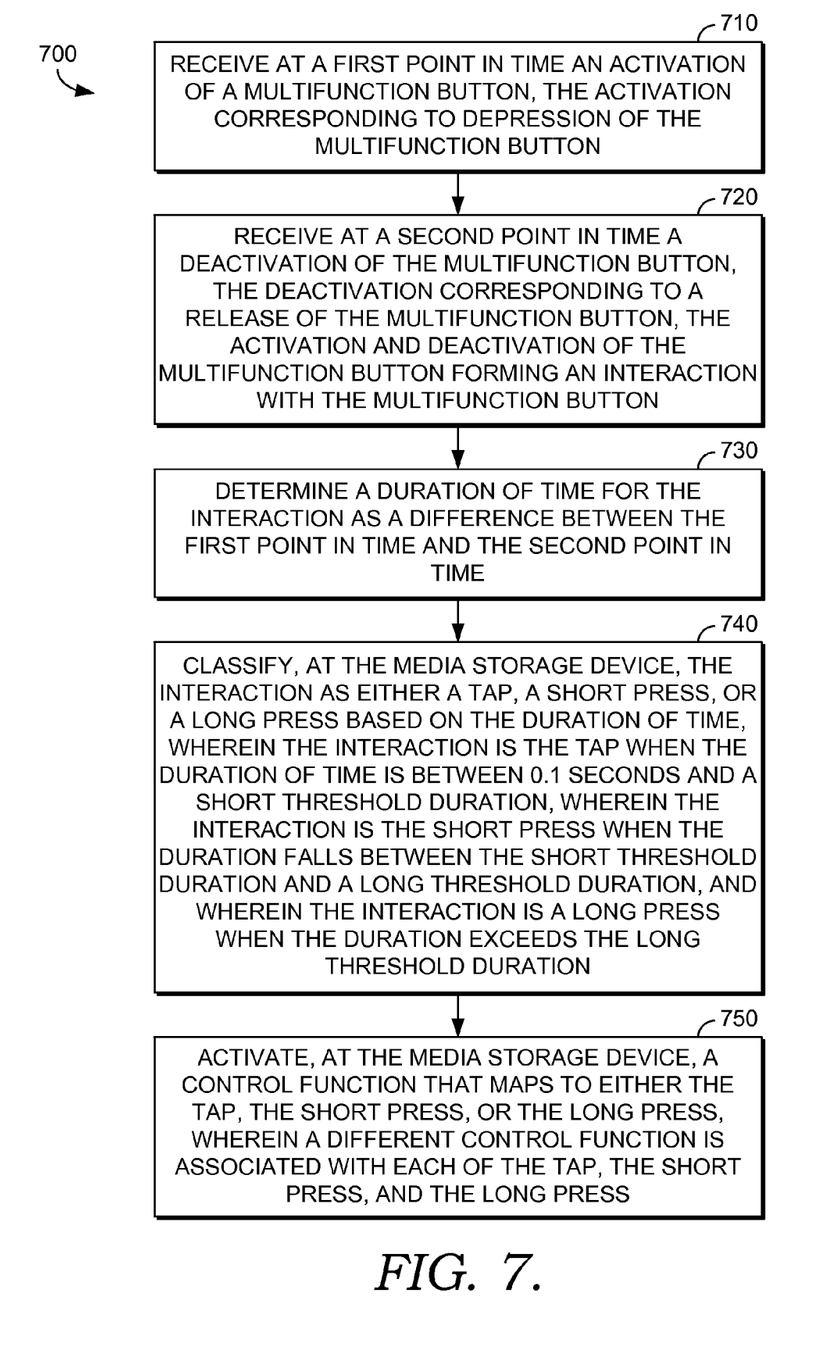
FIG. 7 is a diagram of a flow chart showing a method of controlling audio or visual functions in a media storage device through a single multifunction button, in accordance with an aspect of the present invention.

Turning now to FIG. 7, a method 700 of controlling audio visual functions in a media storage device through a single multifunction button is described. The media storage device may be similar to storage device 200 described previously. The multifunction button may be a hard physical button that moves up and down in response to a user's finger or some other object. The multifunction button may also be a soft button, such as may be found on a touchscreen device.

At step 710, an activation of a multifunction button is received at a first point in time. The activation corresponds to depression of the multifunction button. In this case, "depression" of the multifunction button can mean touching a soft multifunction button on a touchscreen or other touch-sensitive interface where the surface does not move noticeably in response to the touch.

At step 720, a deactivation of the multifunction button is received at a second point in time. The activation and deactivation may be received through a signal generated by the multifunction button or some other intermediary component. The deactivation corresponds to a release of the multifunction button, which can be a physical release of a button or the removal of an object from a touch-sensitive button. Together, the activation and deactivation of the multifunction button form an interaction with the multifunction button.

At step 730, a duration of time for the interaction is determined as a difference between the first point in time when the activation occurred and the second point in time when the deactivation occurred. For example, if the first point in time was 2.5 seconds prior to the second point in time, then the duration would be 2.5 seconds.

At step 740, the interaction is classified as either a tap, a short press, or a long press based on the duration of time. Other classifications, such as a double tap, extra-long tap, or other classification, are possible. The interaction may be classified as a tap when the duration of time is between 0.1 seconds and a short threshold duration, such as two seconds. The interaction is classified as a short press when the duration falls between the short duration threshold and a long duration threshold. For example, the short duration threshold could be greater than two seconds. The interaction is classified as a long press when the duration exceeds a long duration threshold. In one aspect, the long duration threshold is greater than five seconds. When a long duration threshold is used with the multifunction button, the short duration classification occurs when the duration is greater than the short duration and less than the long duration threshold.

At step 740, a control function that maps to either the tap, the short press, or the long press is activated depending on the classification that occurred at step 730. A different control function is associated with each of the tap, the short press, and the long press.

In one aspect, at a third point in time between the first point in time and the second point in time, a determination is made that the multifunction button has been activated for a duration longer than the short duration threshold. This determination occurs when the button is still effectively pressed down and has not yet been released. Prior to the second point in time when the button is released, an audible instruction is output through a speaker in the storage device that identifies a control function associated with the short press. In other words, the audible instruction identifies what control function will be activated if the user deactivates the multifunction button at the point in time when the message is broadcast or potentially shortly thereafter. Similarly, an audible message could be generated upon determining that the press duration has crossed the end of the short duration threshold into the long press range to identify the control associated with the long press.

Aspects of the invention have been described to be illustrative rather than restrictive. It will be understood that certain features and subcombinations are of utility and may be employed without reference to other features and subcombinations. This is contemplated by and is within the scope of the claims.

The invention claimed is:

1. A method of providing multiple functions through a single button, the method comprising:
receiving, at a computing device, a first interaction with a multifunction button, the first interaction comprising a first press of the multifunction button for a first duration of time;
determining that the first duration of time exceeds a short duration threshold;
in response to determining that the first duration of time exceeds the short duration threshold, outputting a recording of a first audible announcement explaining a first action to be taken if the first press is discontinued;
determining that the first press has been discontinued prior to the first press exceeding a long duration threshold; and
in response to determining that the first press has been discontinued, initiating, at the computing device, a first control function, the first control function being associated with the first action.

2. The method of claim 1, wherein the short duration is two seconds.

3. The method of claim 1, further comprising receiving, at the computing device, a second interaction with the multifunction button.

4. The method of claim 3, wherein the second interaction comprises a second press of the multifunction button for a second duration of time and the method further comprises:
determining the second duration of time exceeds the long duration threshold;
in response to determining the second duration of time exceeds the long duration threshold, outputting a recording of a second audible announcement explaining a second action to be taken if the second press is discontinued;
determining that the second press has been discontinued; and
in response to determining that the second press has been discontinued, initiating a second control function associated with the second action, the second control function being different from the first control function.

5. The method of claim 4, wherein the long duration threshold is at least five seconds.

6. The method of claim 4, wherein the first interaction is transferring an existing audio file or video file and wherein the second interaction is changing a lock status for a stored file.

7. The method of claim 3, wherein the second interaction comprises a double tap associated with a second control function that is different from the first control function, the second control function being recording a new audio file or video file.

8. The method of claim 3, wherein the second interaction comprises a single tap associated with a second control function that is different from the first control function, the second control function being playing an existing audio file or video file.

9. A storage device comprising:
a multifunction button;
a speaker;
a microphone;
a processor coupled to the multifunction button, the speaker, and the microphone; and
a computer storage media coupled to the processor and containing program instructions that, when executed by the processor, cause operations to be performed, the operations comprising:
receiving a first interaction with the multifunction button, the first interaction comprising a first press of the multifunction button for a first duration of time;

determining that the first duration exceeds a short duration threshold;

in response to said determining, outputting to the speaker a recording of a first audible announcement explaining a first action to be taken if the first press is discontinued;

determining that the first press has been discontinued prior to the first press exceeding a long duration threshold; and in response to said determining that the first press has been discontinued, initiating, at the storage device, a first control function.

10. The storage device of claim 9, wherein the operations further comprise:

receiving a second interaction with the multifunction button, the second interaction comprising a second press of the multifunction button in a down position for a second duration of time;

determining that the second duration exceeds the long duration threshold;

in response to said determining, outputting to the speaker a recording of a second audible announcement explaining a second action to be taken if the second press is discontinued;

determining that the second press has been discontinued; and in response to said determining that the second press has been discontinued, initiating, at the storage device, a second control function that is different from the first control function.

11. The storage device of claim 10, wherein the operations further comprise:

receiving, at the storage device, a third interaction with the multifunction button comprising a tap, wherein the tap is a contact with the multifunction button lasting less than the short duration threshold;

in response to the third interaction, initiating, at the storage device, a third control function, which is different from the first control function and the second control function.

12. The storage device of claim 10, wherein the multifunction button is an only control input for the storage device.

13. The storage device of claim 9, wherein the short duration threshold is at least two seconds.

14. The storage device of claim 9, wherein the long duration threshold is at least five seconds.

15. The storage device of claim 9, wherein the long duration threshold is more than two seconds longer than the short duration threshold.

16. One or more computer storage media having computer-executable instructions embodied thereon that, when executed by a computer processor, perform a method of controlling audio or visual functions in a media storage device through a single multifunction button, the method comprising:

receiving at a first point in time an activation of a multifunction button, the activation corresponding to depression of the multifunction button;

at a second point in time after the first point in time, determining that the multifunction button has been activated for a duration longer than a short duration threshold;

outputting an audible instruction identifying a control function associated with a short press interaction;

receiving at a third point in time after the second point in time a deactivation of the multifunction button, the deactivation corresponding to a release of the multifunction button, the activation and the deactivation of the multifunction button forming an interaction with the multifunction button;

determining a duration of time for the interaction as a difference between the first point in time and the third point in time; and activating, at the media storage device, a selected control function associated with the duration of time for the interaction.

17. The media of claim 16, the method further comprising:

at a fourth point in time, determining that the multifunction button has been activated for a duration longer than a long duration threshold, the fourth point in time being between the second point in time and the third point in time; and prior to the third point in time, outputting an audible instruction identifying a control function associated with a long press interaction.

18. The media of claim 16, wherein the multifunction button controls all audio controls available on the media storage device.

19. The media of claim 18, wherein the all audio controls comprise one or more of recording a new audio file or video file, playing an existing audio file or video file, transferring the existing audio file or video file, or changing a lock status for a stored file.

20. The media of claim 16 further comprising classifying the interaction as a short press based on the duration of time between the first point in time and the third point in time, wherein the selected control function that is activated is the control function associated with the short press interaction.

* * * * *